US005105994A

United States Patent [19]

Jouillat et al.

[11] Patent Number: 5,105,994

[45] Date of Patent: Apr. 21, 1992

[54] PRECOMPRESSION METERING PUMP WITH A TONGUED COLLAR TO AID PRIMING

[75] Inventors: Claude Jouillat, Montigny-sur-Avre; Michel Brunet, Sainte-Colombe-la-Commanderie, both of France

[73] Assignee: Societe Technique de Pulverisation - S.T.E.P., Verneuil-Sur-Avre, France

[21] Appl. No.: 637,840

[22] Filed: Jan. 7, 1991

[30] Foreign Application Priority Data

Jan. 8, 1990 [FR] France .................................. 9000116

[51] Int. Cl.[5] .............................................. G01F 11/30

[52] U.S. Cl. .................................... 222/341; 222/321; 222/385; 417/559

[58] Field of Search ............... 222/321, 341, 383, 385; 417/559, 560

[56] References Cited

U.S. PATENT DOCUMENTS 3,746,260 7/1973 Boris .................................. 239/321
4,762,475 8/1988 Fuchs .............................. 222/383 X
4,930,999 6/1990 Brunet et al. ........................ 417/552

FOREIGN PATENT DOCUMENTS 0025224 3/1981 European Pat. Off. .
0298259 1/1989 European Pat. Off. ........... 222/385
2626851 8/1989 France .

*Primary Examiner*—Kevin R. Shaver
*Assistant Examiner*—Joseph A. Kaufman
*Attorney, Agent, or Firm*—Sughrue, Mion, Zinn, Macpeak and Seas

[57] ABSTRACT

A prior art precompression metering pump which incorporates a differential piston forming part of the pump chamber inlet valve and its outlet valve is difficult to prime, especially in the case of metering paste products. In the improved pump there is disposed between the differential piston and the main piston of the pump a collar consisting of a ring from which project substantially axial tongues which are slightly inwardly inclined and each provided with a head. The collar moves inside the pump body so that normal operation proceeds as if it were not present. To prime the pump, however, the user depresses the collar until it contacts a step on the pump body. The tongues then bend so that their heads, interposed between the two pistons, move the latter apart (by a wedging effect or by a lever arm effect, or by a combination of the two). This is followed by mechanical opening of the pump chamber outlet valve whereby the air initially contained in the pump chamber escapes to the exterior.

8 Claims, 6 Drawing Sheets

PRECOMPRESSION METERING PUMP WITH A TONGUED COLLAR TO AID PRIMING

BACKGROUND OF THE INVENTION

1. Field of the Invention

The present invention concerns an improved precompression metering pump used in the prior art to dispense liquid or paste products in the form of a spray. The invention is directed to improving the priming of the pump whilst ensuring that the pump is simple to assemble.

2. Description of the prior art

Of the various types of dispensing valve currently placed on receptacles containing liquids or pastes, precompression metering pumps have numerous advantages. Firstly the fluid substance is delivered essentially due to manual action. This avoids the need for a propellant gas such as freon, now known to be ar atmospheric pollutant, or such as nitrogen which occupies dead volume in the receptacle. In addition, the receptacle no longer needs to be specially reinforced in order to contain a substance under high pressure. The metering function is also very useful in the cosmetic industry and the pharmaceutical industry where the quantity of substance delivered each time the pump is actuated needs to be quite accurate. The precompression of the volume of substance to be expelled also makes using this type of valve particularly clean, both by avoiding any untimely leaks, and by ensuring that the substance runs out with the desired vigor. Finally, this disposition ensures good isolation between the contents of the receptacle and ambient air, thereby avoiding the dispensing valve becoming clogged by dried or oxidized substance.

A particularly advantageous precompression metering pump was designed, at least in principle, by the firm Rudolph Albert (see French patent number 1 486 392, filed in 1966). It is of increased reliability and accuracy, and it makes do with only one return spring, and as a result it has been subject to continual improvement ever since. Three of the figures accompanying this description are vertical sections through one particular embodiment of this prior art pump which is described to illustrate the technological background. The embodiment shown is much more recent than the above-mentioned patent, and is substantially the same as the pump disclosed in French patent number 2 305 241 filed by the firm S.T.E.P. in 1975, and this version of the pump is capable of operating with its valve in any orientation relative to the vertical.

From accompanying FIGS. 1 to 3 which show the pump at different moments while it is in use, it can be seen that it comprises five cylindrical parts which are assembled in such a manner that their respective axes of revolution coincide. In the figures, the resulting common axis is disposed vertically. Thus, the substance is delivered via the top portions of the sections while the bottom portions thereof are for insertion into a receptacle or tank (not shown) containing the substance to be delivered.

The five component parts of the prior art pump are as follows:

a turret 1 having a base 11 for fitting to the neck of the tank containing the substance and for being fastened thereto in sealed manner by complementary means (also not shown);

a pump body 2 whose top end 21 snap-fastens in the above turret 1 and whose bottom end 22 communicates with the inside of the tank either directly (as shown), or else via a dip tube fitted over a tube-receiving endpiece (not shown) on the body 2. In addition, a sleeve 24 extends the bottom 22 of the pump body inwards. The annular space between said sleeve 24 and the pump body 2 correspond essentially to the pump chamber 23 of the metering pump;

a first piston 3 suitable for sliding in sealed manner inside the pump body 2 from a high rest position shown in FIG. 1 (with the piston 3 being in contact with an inside rim 12 of the turret 1) to a low position shown in FIG. 2, and defined in a manner explained below with regard to the differential piston 4. The piston 3 has at the tank end a foot 34 forming a piston which isolates and pressurizes the pump chamber 23. The piston 3 also extends upwards in the form of an actuator rod 31. The rod has a central channel 33 through which the substance is delivered. The cross-section of the channel is not constant, and in particular there is a choking step 32 about halfway along the channel 33;

a differential piston 4 which extends upwards in the form of a valve needle 41 engaged inside the rod 31 of the first piston 3 such that the conical tip of the needle is shaped to rest against the choking step 32. Downwardly, the differential piston 4 is extended by a skirt 42 adapted to fit around the sleeve 24 integral with the pump body 2. The outside surface of the skirt 42 has guiding blades 46 for guidance purposes inside the pump body 2, while its inside surface has inwardly directly sealing lip 43. The lip serves to cut off communication between the tank and the pump chamber 23 as soon as the two parts are engaged. The inside surface of the skirt 42 is also provided with a shoulder 45 for coming into abutment against the sleeve 24, thereby defining the bottom position of the differential piston 4 (see FIG. 2). Between its needle 41 and its skirt 42, the differential piston has an upwardly directed step 44 which determines its mode of hydraulic operation; and a return spring 5 disposed between the differential piston 4 and the bottom 22 of the pump body 2.

In order to cause a measured quantity of substance to be delivered, it is necessary to push the rod 31 of the first piston 3 into the pump body 2. This ensures that the needle 41 is engaged against the choking step 32, since the spring 5 tends to oppose the descent of the differential piston 4. The resilience of the parts contribute to establishing sealed contact, thereby ensuring that the delivery channel 33 is closed. Simultaneously, the differential piston 4 is driven towards the bottom 22 of the pump body 2. The skirt 42 of the piston 4 thus engages over the sleeve 24 of the pump body 2 such that the pump chamber 23 is isolated both from the outside and from the tank. Assuming that it was initially full of substance, the pressure of the substance will increase rapidly due to the forced reduction in volume of the chamber 23. However, this pressure is also applied to the step 44 on the differential piston 4 and the area of this step is deliberately greater than the area of the bottom edge of the skirt 42. As a result, once the pressure becomes high enough, (by definition, equal to said precompression pressure) it exerts a vertical force on the differential piston 4 capable of overcoming the force from the spring 5. The needle 41 then withdraws from the choking step 32, thus leaving an open passage to the outside for the substance under pressure The various parts are then in the configuration shown in FIG. 3.

As soon as the pressure in the substance in the pump chamber 23 drops off, the spring 5 closes the delivery channel 33 by thrusting the needle 41 of the differential piston 4 back against the choking step 32 of the rod 31. When the manual force is released, the spring 5 causes both pistons 3 and 4 to rise. The volume of the pump chamber 23 then increases again. This therefore sets up suction. As soon as the skirt 42 of the differential piston 4 disengages from the sleeve 24, substance is sucked from the tank into the chamber 23. The substance contained in the chamber 23 then constitutes the next metered quantity which will be delivered when the pump is next operated.

However, this mode of operation requires the pump chamber 23 to be satisfactorily filled initially. Priming is the weak point of this type of precompression metering pump. If the pump chamber 23 contains air, then its reduction in size is not sufficient to compress gas adequately since gas is much more compressible than are the liquids or pastes which are normally delivered. The volume of air is therefore not expelled from the pump chamber 23 since the needle 41 remains pressed against the choking step 32. When the pistons move back up, no suction is established and no significant quantity of substance is drawn into the chamber.

This problem of priming was recognized very early on. In 1971, the firm S.T.E.P. proposed a remedy in French patent number 2 133 259. The idea was to allow the air compressed in the pump chamber to escape therefrom so as to contribute to establishing suction therein when its volume was next increased. However, so far, this idea was initially put into practice when delivering compressed air to the inside of the receptacle. For the pump shown in FIGS. 1 to 3, this is advantageously achieved by means of a small spline 25 placed at the base of the sleeve 24 inside the chamber 23. When the chamber is full of air, the differential piston 4 can be pushed right down (i.e. until its inside shoulder 45 comes into abutment against the top of the sleeve 24) into the low or priming position shown in FIG. 2 as described above. As shown in FIG. 2, the small spline 25 then raises the skirt 42 locally so that air can escape towards the inside of the pump body 2 which is in communication with the tank.

This priming method has a number of disadvantages. Firstly, and whatever the product to be dispensed, the pump is difficult to manufacture. The spline 25 is a small rib projecting very slightly from the surface of the sleeve 24 (typically by 4/100 mm). The molds in which the pump body 2 is molded are subject to rapid dulling of the corresponding notch after a few molding cycles alternating with cleaning cycles.

Then, in normal operation of the pump, the exterior compression force may be applied with slightly too much violence. The differential piston 4 may then impact on the sleeve 24 whereas with less violent operation the dispensing of the product is completed before this extreme bottom position is reached. The result is that part of the dose returns to the interior of the tank rather than being expelled to the exterior through the outlet valve. In other words, the volume of the dose dispensed becomes dependent on how the pump is operated. The resulting variations from one use to another are often troublesome in practice, especially in the case of medication.

A pump of this kind with a priming spline is equally unsuitable for other products. This applies to all products which are damaged by contact with air, of course, and also to all relatively thick paste products. In this case the entry of air into the tank results only in the formation of a bubble which generally adheres to the pump body 2. When the pistons are raised the air from the bubble is sucked into the pump chamber 23 which therefore is never primed, as it were.

Attempts were then made to expell the air initially contained in the pump chamber to the exterior of the tank. The company S.T.E.P. (European Patent Application No 89-401 449.7 claiming priority from three French applications: FR88-07337, FR88-16722 and FR89-06817 proposed a priming system comprising spring means and a cylindrical member. This system was adapted to be accommodated in the outlet channel 33 of the first piston 3, in an enlarged cross-section part extending from the seat 32 of the usual outlet valve to a point in the proximity of the mouth of the hollow actuator rod 31. The cylindrical member is then able to collaborate with the valve needle 41 of the differential piston 4 and with the actuator rod 31 to form a second outlet valve at the same level as the usual valve. The latter opens in the low position of the pistons (the priming position, see FIG. 2) whereas the differential piston 4, abutted against the sleeve 24, pushes back the cylindrical member against the action of the return spring means accommodated in the actuator rod 31.

Although this priming system confers upon the pump all the advantages of expelling the air to the exterior, it still has disadvantages relating in particular to the assembly of the parts. As compared with the prior art pump, this requires several additional operations to fit the spring means and the cylindrical member inside the widened part of the outlet channel 33 provided for this purpose. These operations are also somewhat delicate and can result in poor centering of the part which then becomes jammed crosswise of the channel 33. In other words, the presence of the priming system increases the percentage of pumps which are rejected.

For this reason one object of the present invention is an improvement to the precompression metering pump described above which enables the air initially contained in the pump chamber to be expelled to the exterior and which also leads to more favorable assembly conditions through reducing the number of operations to be carried out and through securing quasi automatic positioning of the parts relative to each other.

SUMMARY OF THE INVENTION

The present invention provides a precompression metering pump for dispensing a liquid or a paste from a receptacle in the form of a spray, said pump comprising on a common axis of revolution:

a pump body communicating with said receptacle via a sleeve inside said pump body, a first piston sliding inside said pump body and having, on the side towards said receptacle, a foot in sealed contact with said pump body to isolate a pump chamber within said body and, on the side opposite said receptacle, an actuator rod incorporating a dispensing channel whose cross-section has a choking step, a differential piston sliding inside said pump body with, on the side towards said receptacle, a skirt with a free end adapted to be engaged in a sealed way to said sleeve of said pump body to isolate said pump chamber from said receptacle and having, at the end opposite said receptacle, a valve needle inserted in said dispensing channel of said first piston and adapted to abut against said choking step to form with it an outlet valve for said product outside said pump chamber, said differential piston further having where said skirt and said valve needle meet a step on the side away from said receptacle, and a return spring disposed between said differential piston and said pump body around and bearing on a centering finger carried by said differential piston at the end towards said receptacle, in which pump a collar is interposed between said first piston and said differential piston and comprises a ring carrying on one edge a series of tongues which are equally spaced in the circumferential direction, flexible lengthwise, inclined to said axis of revolution and end in a respective head, said collar surrounding said differential piston with clearance, said ring sliding in said pump body and each head remaining in contact at a first point with said foot of said first piston and at a second point with said step of said differential piston, said pump body comprising abutment means for the other edge of said ring of said collar, at least one of the following two geometrical conditions applying:

a—said second point of contact is at a distance from said axis of revolution substantially less than the distance between said first point of con&act and said axis so that said collar enables opening of said valve on the first actuation of said pump by causing, after said ring contacts said abutment means, relative axial separation of said differential piston and said first piston as the result of a lever arm effect;

b—the annular space delimited by said foot of said first piston and said step of said differential piston converges towards said axis of revolution so that said collar enables opening of said outlet valve on the first actuation of said pump by causing, after its ring contacts said abutment means, relative axial separation of said differential piston and said first piston as the result of a wedging effect.

Said abutment means for said ring of said collar consist in an annular shoulder on the interior wall of said pump body. Said centering finger is advantageously extended as far as the edge of said skirt. If necessary, said step of said differential piston is inclined to said axis of revolution to form a frustum of a cone whose smaller cross-section end is on the side away from said tank.

In a preferred embodiment of the invention, each head has an oval shape.

In another advantageous embodiment of the invention, each head comprises a hook at the end curved towards the interior of said collar and a branch extending from the back of said tongue parallel to said axis of revolution.

Said ring is preferably molded from a plastics material adapted to form a spring.

Other features and advantages of the invention will emerge from the following detailed description given by way of non-limiting example only with reference to the appended diagrammatic drawings which show to embodiments of the improved pump.

BRIEF DESCRIPTION OF THE DRAWINGS

In FIG. 1 the pump is shown at rest (high position). In FIG. 2 it is shown during a priming stage (low position). In FIG. 3 it is shown during an intermediate stage for delivering a liquid or a paste.

FIG. 7 shows it in the rest (high) position. FIG. 8 shows it in the priming (low) position.

DETAILED DESCRIPTION OF THE INVENTION

It goes without saying that all of the above drawings are to a very much enlarged scale relative to the actual size of the metering pump. The diameter of the pump body is in the order of 5 mm.

Figure 3:
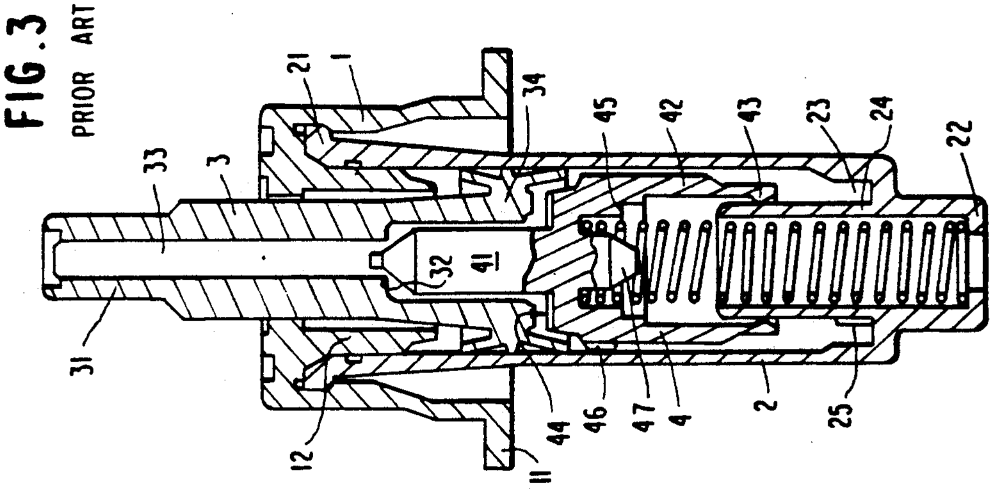
FIG. 3 PRIOR ART
FIGS. 1 to 3 are axial cross-sections through a prior art precompression metering pump.
Figure 2:
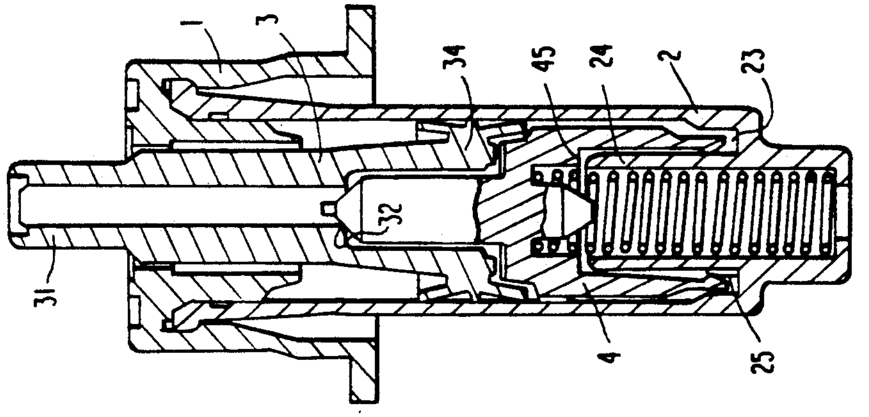
FIG. 2 PRIOR ART
Figure 1:
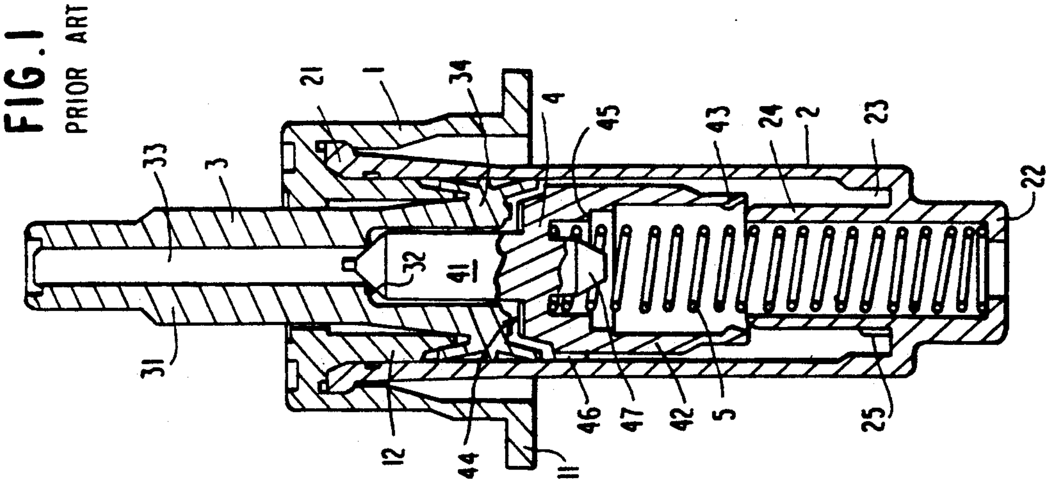
FIG. 1 PRIOR ART
Figure 4:
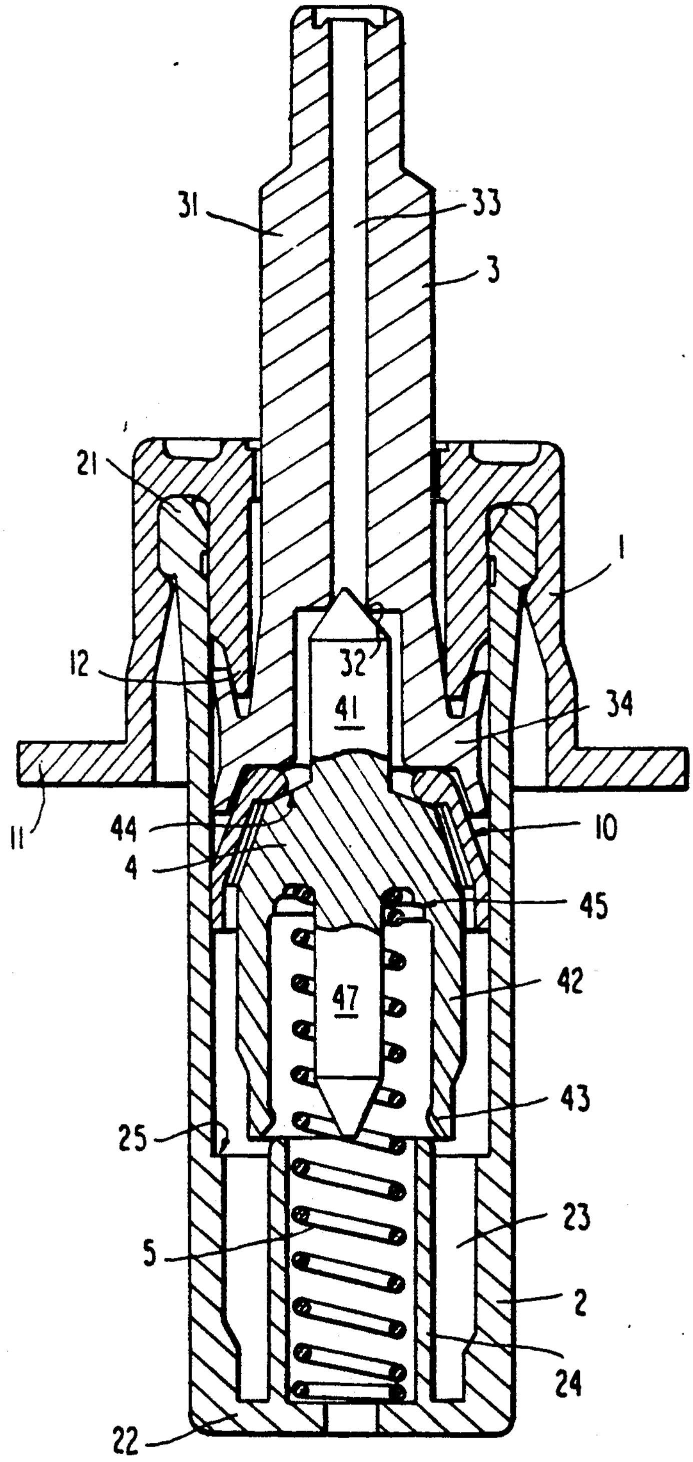
FIG. 4 is an axial cross-section through a precompression metering pump incorporating a first embodiment of the present invention.

If the axial cross-section of FIG. 1 showing a prior art precompression metering pump is compared with the similar cross-section in FIG. 4, one essential difference is immediately apparent. This is an additional component 10 which will be referred to hereinafter as the "interposition ring" primarily because of its position within the arrangement of the various component parts of the pump. Part of this ring is clearly "interposed" between the first piston 3 and the differential piston 4 of the pump.

Figure 5:
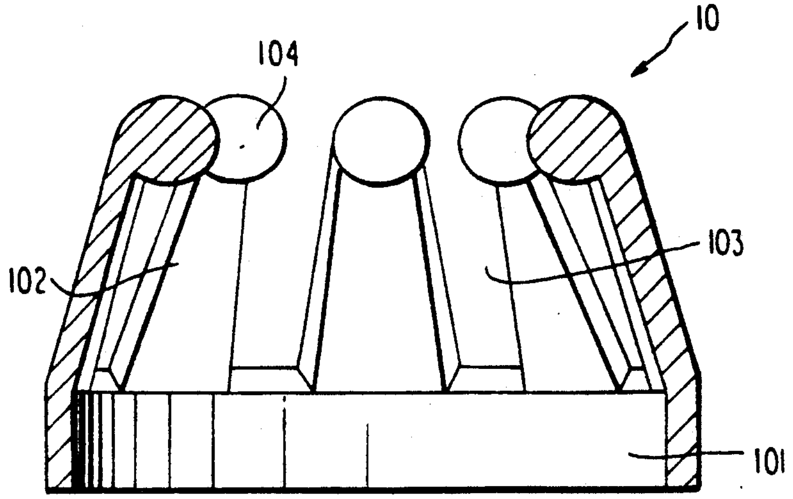
FIGS. 5 and 6 are respectively axial crosssection and plan views of an interposition ring of the first embodiment of the present invention (FIG. 4).
Figure 6:
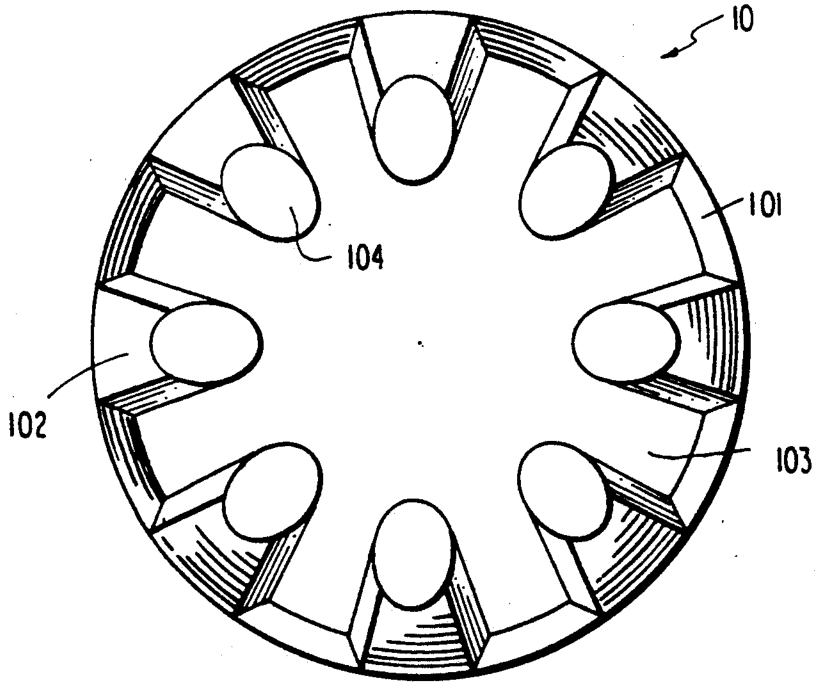
Figure 7:
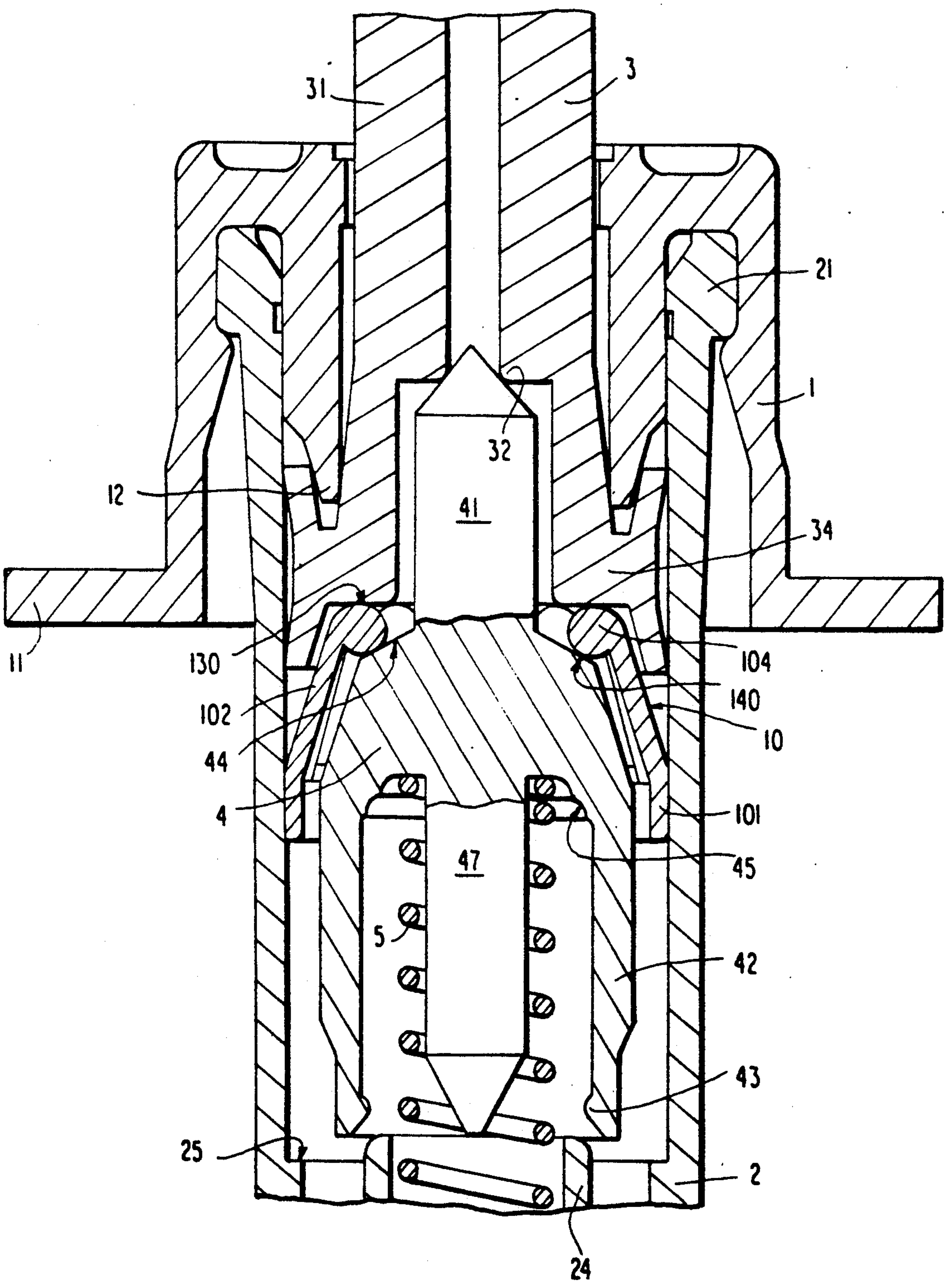
FIGS. 7 and 8 show details of the pump from FIG. 4 in axial cross-section.
Figure 8:
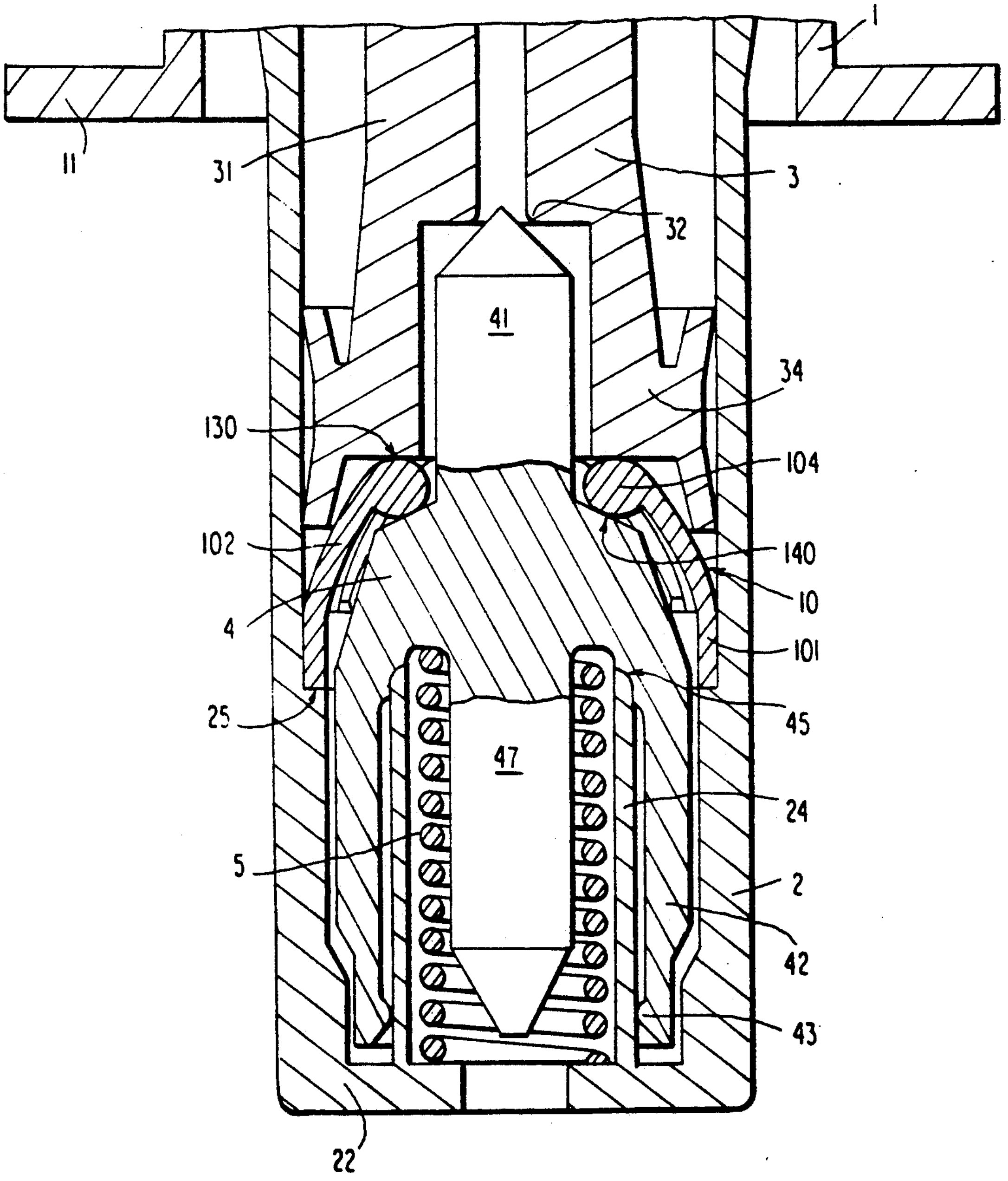

As can be seen more clearly from the axial crosssection and plan views of FIGS. 5 and 6, respectively, showing only the collar 10, the latter comprises a thin ring 101. One edge of the ring 101 is extended by tongues 102 separated by notches 103. The drawings show eight tongues 102 equally spaced around the circumference of the ring 101. It goes without saying that the number of tongues could be changed without departing form the scope of the invention. According to the invention, the tongues 102 have some lengthwise flexibility. Similarly, in the direction away from the ring 101 they converge towards its center. Their respective heads 104 are therefore relatively close to each other, on a circle coaxial with the collar 10 whose radius is less than the radius of the ring 101. In the first embodiment of the present invention as shown in FIGS. 4 to 8, each head 104 is somewhat oval in shape.

It is these heads which are interposed between the pistons 3 and 4 of the prior art pump. As seen more clearly in FIG. 7, each of the heads 104 is in contact with the horizontal foot 34 of the piston 3 at a point referenced 130 and with the step 44 of the differential piston 4 at a point referenced 140. The tongues 102 and the ring 101 extend around the differential piston 4. In other words, most of the interposition ring overlies the enlarged part of the differential piston 4, the valve needle 41 of the latter being engaged between the various heads 104 whereas its skirt 42 projects beyond the ring 101 in the opposite direction, in such a way as to procure a large clearance between the collar 10 and the piston 4. If necessary, the shape of the piston is modified as compared with the prior art system to achieve this objective.

In the unimproved pump as shown in FIG. 1 the differential piston 4 has guiding blades 46 which center it in the pump body 2 throughout its travel. In accordance with the present invention, the centering is achieved by virtue of the coaxial arrangement within the collar 10 as described above. This is because, according to another feature of the present invention, the outside radius of the ring 101 is such that the collar 10 can be inserted in the pump body 2 and move along its inside wall with slight friction. This friction is, for example, comparable with the friction due to the sealing lips carried by the foot 34 of the piston 3, and so operation of the improved pump is not significantly more difficult. When the collar 10 has been fitted into the pump body 2, its axis remains coincident with the pump axis. The bearing engagement of the heads 104 on the inclined step 44 at the various points of contact 140 secures automatic centering of the differential piston 4.

This auto-centering is further favored by extending the finger 47 which projects on the differential piston 4 at the center of its skirt 42. Conventionally, the finger 47 supports the spring 5. Here it is extended as far as the sealing lip 43. The spring 5 which surrounds it maintains a coaxial relationship. However, this particular construction of the finger 47 has an additional advantage in connection with the hydraulic operation of the pump. This will be explained in more detail in later sections giving particular emphasis to this aspect of the invention.

In normal operation, that is to say when the pump chamber 23 is initially filled with product to be dispensed, the presence of the collar 10 has no effect as compared with the prior art pump. This is because the collar 10 with its notches 103 presents no obstacle to the movement of the product. The few points of contact 130 or 140 with the pistons do not alter the hydraulic behavior of the system as a whole. As in the prior art, if an external force is applied to the actuator rod 31, the pump chamber 23 can be isolated by engagement of the skirt 42 onto the sleeve 24 and the pressure in the pump chamber increases to the point of causing the piston 4 to be retracted against the action of the spring 5 and so to open the pump outlet valve. The dispensing of the product continues until the volume of the chamber 23 has become so small that it is no longer possible to maintain the precompression pressure and the outlet valve closes. This generally happens before the pistons have reached the end of their travel. The collar 10 is still interposed between the pistons and is not pushed back to the point where it contacts the abutment means provided in accordance with the invention. The abutment means comprise, for example, an annular step 25 formed on the inside wall of the pump body 2. However, if any such contact occurred during normal operation of this pump, this would not matter.

The process for priming the improved pump would then take place. This process will now be described with reference to FIG. 8. As soon as the pump chamber 23 contains only air, i.e. a highly compressible fluid, operation of the pump leads to the pistons completing their travel without the outlet valve opening, the pressure in the chamber remaining below the precompression pressure despite the reduced volume. The location of the step 25 on the inside wall of the pump body 2 is chosen such that as the pistons reach the end of their travel, the collar 10 first abuts the step 25, whereafter the differential piston 4 abuts against the sleeve 24 at its shoulder 45, this further (small) travel representing the bending of the tongues 102 of the collar 10 when they are compressed by the piston 3. Some damping of the end of travel movement of the pistons is therefore achieved. Also, given the inclination of the tongues 102, this bending is inevitably accompanied by translation movement of the heads 104 towards the axis of the pump. To put this another way, the collar 10 is deformed in a way which tightens the heads 104 against each other, the tongues 102 bending towards the axis of the ring 101 and tending to close up on it, as it were.

The points of contact 130 and 140 thus move towards the axis of the pump. The distance separating the points 130 and 140 is virtually constant as it represents the thickness of the heads 104. (It varies by a very small amount according to the state of compression of the heads 104). The point of contact 130 with the piston 3 moves horizontally (on the foot 34 of the piston 3) and the point of contact 140 moves on the step 44 which is inclined to the axis of the pump. The various kinetic forces necessarily cause the two pistons to move apart, the heads interposed between them operating in the manner of wedges entering a tapering channel. As this separation proceeds, the valve needle 41 eventually leaves its seat 32 and opens a passage through which the compressed air in the pump chamber escapes.

Immediately the compression force is removed the return spring 5 can relax. It raises the pistons 3 and 4 and the collar 10 which is still interposed between them. The tongues 102 immediately relax causing the heads 104 to move away from the axis of the pump, which closes the outlet valve. The collar 10 then moves away from the abutment step 25. The friction between the ring 101 and the wall of the valve body 2 slows its upward movement and the heads 104 are entrained towards the top end 21 of the pump body 2. This ensures that the tongues 102 straighten and provides sufficient bearing force of the valve needle 41 against the choking step 32 to allow the elasticity of the parts to come into play and seal the outlet valve.

It is during this phase in which the pistons are raised that the extended finger 47 brings about the second advantage mentioned above. When the pump is in the priming (low) position (FIG. 8), the finger 47 occupies the major part of the interior volume of the sleeve 24. When it rises, a relatively large space is formed and quickly expands. This aspirates the product which passes through the aperture formed in the bottom end 22 of the pump body 2 from the tank into the sleeve 24. The product can easily enter the pump chamber 23 immediately the sleeve 24 is released by the skirt 42.

This aspect of the present invention is particularly advantageous in the case of paste products. These are increasingly packaged in deformable receptacles to which a precompression metering pump with no air inlet is fixed in a sealed way. It is then sufficient to fix the pump while it is maintained in its low position. As a result, the interior of the sleeve 24 is occupied by the finger 47 and contains a very small quantity of air. After the pump is fixed, releasing it causes the paste to enter the pump body 2. The priming as described above merely completes this process, the air expelled from the receptacle being replaced in the pump chamber by a dose of the product.

The extended finger 47 is also beneficial for receptacles of liquid product held at atmospheric pressure. The benefit is particularly clear when the maximum volume of the chamber is significantly less than the volume of the dip tube. This is because the latter is initially filled with air, like the chamber. On completion of priming, product must have been aspirated through all of the tube. The aspiration due to the sudden movement of the extended finger 47 achieves this result, the relevant volume within the sleeve 24 combining with the smaller volume of the pump chamber 23.

This latter advantage of the extended finger 47 is not so trivial as might appear at first sight. In the context of the present invention, only very small pump chambers and therefore doses are practicable. This is due essentially to the presence of the interposition ring in the space which in the prior art is given over entirely to the chamber. This means that doses must be in the order of a few tens of microliters. They can have values of only 16 $\mu$l, or even 5 $\mu$l, if the travel of the pistons is reduced. Reducing the travel of the pistons is beneficial in the case of automatic actuation of the pump (by a system such as a motor-driven trigger). This makes it possible to deliver repetitive doses at frequencies up to 100 doses per second and above. In this case it is advisable to mold the various parts of the pump from a very light plastics material so that the kinetic energies involved are relatively small. These arrangements result in the maintained emission of finely vaporized product which is highly advantageous with perfumes (whose fragrancy properties are thereby very considerably increased) and inhaler type medications (which are better absorbed by the wall of the bronchi).

Figure 9:
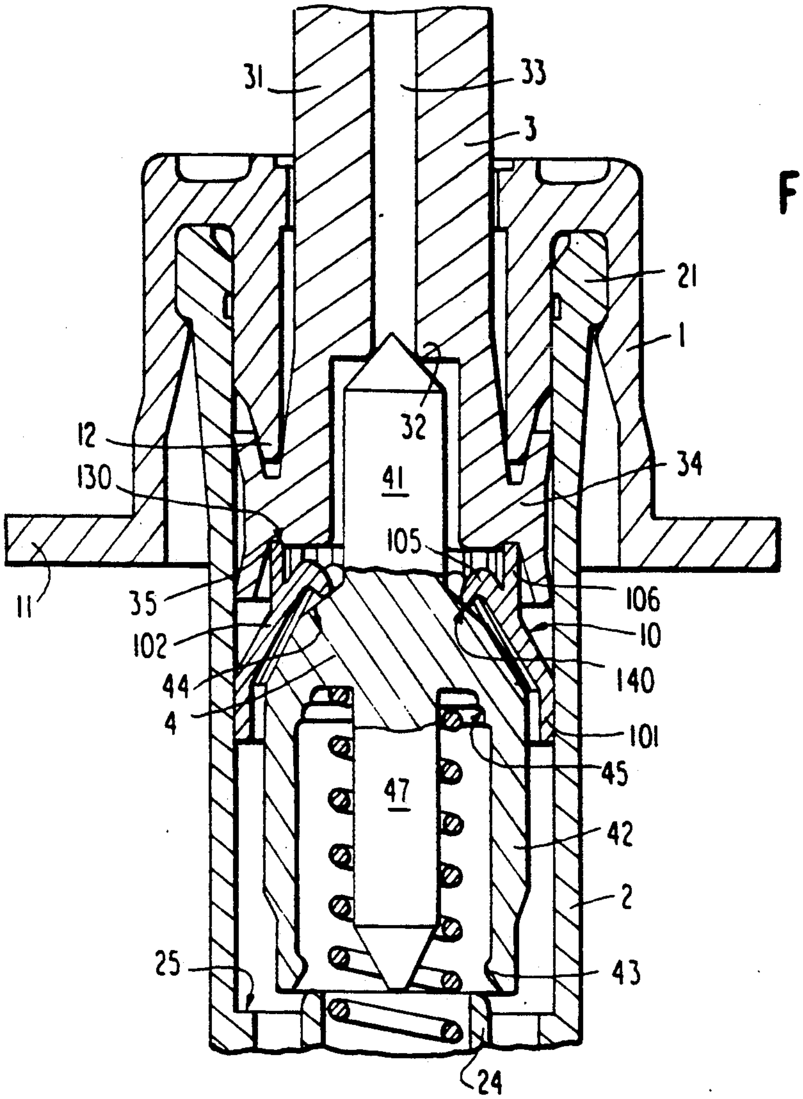
FIG. 9 shows a detail of the axial cross-section through a precompression metering pump incorporating a second embodiment of the present invention.

FIG. 9 shows another embodiment of the present invention. It is an axial cross-section similar to the previous two figures, showing an interposition ring 10 whose tongues 102 have different heads. These comprise firstly a kind of inwardly curved hook 105. The end of this hook 105 is in contact at the point 140 with the inclined step 44 of the differential piston 4. Before its hook-shaped part, the tongue 102 has a kind of branch 106. This extends from the exterior or back of the tongue 102 in a direction parallel to the axis of the pump. Its free end is in contact with the piston 3 at the point 130.

Although this collar 10 is adapted to collaborate with the pistons 3 and 4 in exactly the same way as the previous collar, that is to say by a wedging effect, another mechanism is possible here. This can be combined with the wedging effect as those skilled in the art will readily understand from the following description. However, this second embodiment requires that the ends of the branches 106 are inserted in an annular groove 35 formed on the foot 34 of the piston 3. In other words, the points of contact 130 no longer move on the foot 34, the branches 106 being locked in place by the edges of the groove 35.

This difference does not affect the normal operation of the pump or the main priming stages. In the case of priming, the application of external compression depresses both pistons which move together, with the collar 10 interposed between them, towards the bottom end 22 of the pump body. As previously, this causes the collar 10 to contact the abutment step 25 on the interior wall of the pump body, followed shortly afterwards, during which time the tongues 102 are bent by the piston 3, by the differential piston 4 contacting the sleeve 24. As with the first collar 10 described here, the outlet valve then opens and the air initially in the pump chamber is expelled to the exterior.

Figure 10:
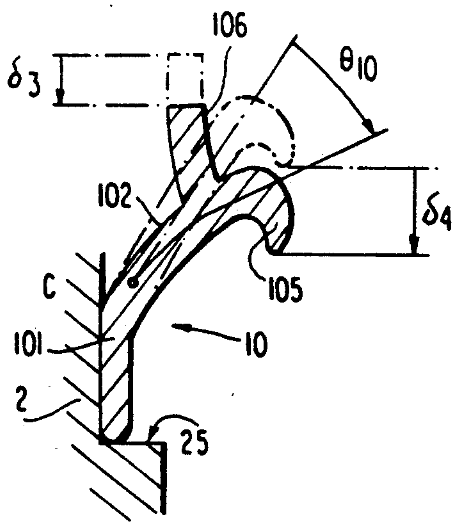
FIG. 10 is a longitudinal half-section of an interposition elastic ring of the second embodiment of the present invention (FIG. 9) shown in the undeformed position (dashed line) and in the deformed position (full line).

However, the mechanical interaction of the collar 10 with the pistons 3 and 4 is very different. The locking of the free ends of the branches 106 in the groove 35 means that it moves only vertically between the collar 10 contacting the abutment step 25 and the differential piston 4 contacting the sleeve 24. This displacement is denoted $\delta_3$ in FIG. 10 which shows the collar 10 in longitudinal half-section in dashed outline when it is undeformed (at the time that the collar contacts the abutment step) and in full outline when it is bent (at the time that the differential piston contacts the sleeve). This displacement $\partial_3$ therefore represents displacement of the piston 3 only (whence the suffix). The tongues 102 are then bent, which represents a pivoting of their respective axes. In the diagram this pivoting is denoted $\theta_{10}$, the suffix 10 referring to the collar 10. It occurs about a point C near the root of the collar on the ring 101, which is not deformed. The end of the hook 105 is farther away from the point C than the branch 106 is on the tongue 102. For the same $\delta_{10}$, the vertical displacement $\delta$of the hook 105 is therefore greater than that $\delta_3$ of the branch 106. The differential piston 4 therefore moves farther than the piston 3 between the time at which the collar 10 contacts the abutment step 25 and the time at which the differential piston 4 contacts the sleeve 24. This guarantees separation of the valve needle 41 from the seat 32, that is to say the required opening of the outlet valve. To summarize, this second embodiment of the collar 10 uses a lever arm effect.

Obviously, whether the collar 10 operates by a wedging effect, by a lever arm effect or by the two in combination, it is essential that it be sufficiently flexible. It is therefore preferably molded from a plastics material adapted to act as a spring. The molded collar is fitted in single operation by inserting it into the pump body after the differential piston. As already emphasized, the collar is automatically centered relative to the pistons. In this way the present invention provides a total solution to the problem as stated.

There is claimed:

1. Precompression metering pump for dispensing a liquid or a paste from a receptacle in the form of a spray, said pump comprising on a common axis of revolution:
   - a pump body having a pump chamber, the pump body communicating with said receptacle via a sleeve inside said pump body,
   - a first piston sliding inside said pump body and having, on the side towards said receptacle, a foot in sealed contact with said pump body to isolate the pump chamber within said body and, on the side opposite said receptacle, an actuator rod incorporating a dispensing channel whose cross-section has a chocking step,
   - a differential piston sliding inside said pump body with, on the side towards said receptacle, a skirt with a free end adapted to be engaged in a sealed way to said sleeve of said pump body to isolate said pump chamber from said receptacle, a centering finger disposed within the skirt, the differential piston having, at the end opposite said receptacle, a valve needle inserted in said dispensing channel of said first piston and adapted to abut against said choking step to form with it an outlet valve for said product outside said pump chamber, said differential piston further having, where said skirt and said valve needle meet, an annular step on the side away from said receptacle,
   - a return spring disposed between said differential piston and said pump body around and bearing on the centering finger carried by said differential piston at the end towards said receptacle, and a collar interposed between said first piston and said differential piston and comprising a ring carrying on one edge a series of tongues which are equally spaced in the circumferential direction, flexible lengthwise, inclined to said axis of revolution and end in a respective head, said collar surrounding said differential piston with clearance, said ring sliding in said pump body and each head remaining in contact at a first point with said foot of said first piston and at a second point with said step of said differential piston, said pump body comprising abutment means for the other edge of said ring of said collar, at least one of the following two geometrical conditions applying:

a) said second point of contact is at a distance from said axis of revolution substantially less than the distance between said first point of contact and said axis so that said collar enables opening of said valve on the first actuation of said pump by causing, after said ring contacts said abutment means, relative axial separation of said differential piston and said first piston as the result of a lever arm effect; and b) the annular space delimited by said foot of said first piston and said step of said differential piston converges towards said axis of revolution so that said collar enables opening of said outlet valve on the first actuation of said pump by causing, after its ring contacts said abutment means, relative axial separation of said differential piston and said first piston as the result of a wedging effect.

2. Pump according to claim 1 wherein said abutment means for said ring of said collar comprises an annular shoulder on the interior wall of said pump body.

3. Pump according to claim 1 wherein said centering finger is extended as far as the free end of said skirt.

4. Pump according to claim 1 wherein said annuala step of said differential piston is inclined towards said axis of revolution to form a frustum of a cone whose smaller cross-section end is directed away from said receptacle.

5. Pump according to claim 1 wherein each head is oval in shape.

6. Pump according to claim 1 wherein each head comprises an inwardly curved hook at the end and a branch projecting from the back of said hook parallel to said axis of revolution.

7. Pump according to claim 6 wherein said foot of said first piston incorporates an annular groove adapted to accommodate the free end of said branch of each head, said first point of contact being at the bottom of said groove so that its distance from said axis of revolution does not vary.

8. Pump according to claim 1 wherein said collar is molded from a plastics material adapted to form a spring.

* * * * *